(12) United States Patent
Marks

(10) Patent No.: US 9,881,382 B2
(45) Date of Patent: Jan. 30, 2018

(54) METHODS FOR CAPTURING IMAGES OF A CONTROL OBJECT AND TRACKING TO CONTROL INTERFACING WITH VIDEO GAME OBJECTS

(71) Applicant: Sony Computer Entertainment Inc., Tokyo (JP)

(72) Inventor: Richard L. Marks, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 226 days.

(21) Appl. No.: 14/877,844

(22) Filed: Oct. 7, 2015

(65) Prior Publication Data
US 2016/0027188 A1    Jan. 28, 2016

Related U.S. Application Data

(63) Continuation of application No. 10/365,120, filed on Feb. 11, 2003, now Pat. No. 9,177,387.

(51) Int. Cl.
| | |
|---|---|
| *H04N 5/225* | (2006.01) |
| *G06T 7/20* | (2017.01) |
| *A63F 13/213* | (2014.01) |
| *G06K 9/00* | (2006.01) |
| *G06T 13/20* | (2011.01) |
| *G06T 7/50* | (2017.01) |
| *G06T 7/246* | (2017.01) |

(52) U.S. Cl.
CPC ......... *G06T 7/2046* (2013.01); *A63F 13/213* (2014.09); *G06K 9/00342* (2013.01); *G06T 7/246* (2017.01); *G06T 7/251* (2017.01); *G06T 7/50* (2017.01); *G06T 13/20* (2013.01); *H04N 5/225* (2013.01); *G06T 2207/10016* (2013.01); *G06T 2207/30196* (2013.01); *G06T 2207/30208* (2013.01); *G06T 2207/30241* (2013.01); *G06T 2215/16* (2013.01)

(58) Field of Classification Search
CPC ..................... G06T 7/246; G06T 7/251; G06T 2207/10016; G06T 2207/30196; G06T 2207/30208; G06T 13/20; G06T 7/50; G06T 2207/30241; G06T 2215/16; G06K 9/00342; H04N 5/225; A63F 13/213
USPC ........................................................ 345/156
See application file for complete search history.

(56) References Cited

U.S. PATENT DOCUMENTS

| | | | | |
|---|---|---|---|---|
| 5,563,988 A | * | 10/1996 | Maes ...................... | G06F 3/011 345/421 |
| 5,982,352 A | * | 11/1999 | Pryor ........................ | G01S 5/16 345/156 |
| 2002/0183961 A1 | * | 12/2002 | French ............... | A63B 24/0003 73/379.04 |

* cited by examiner

*Primary Examiner* — Bryan Earles
(74) *Attorney, Agent, or Firm* — Martine Penilla Group, LLP

(57) ABSTRACT

Methods for real time motion capture for controlling an object in a video game are provided. One method includes defining a model of a control object and identifying a marker on the control object. The method also includes capturing movement associated with the control object with a video capture device. Then, interpreting the movement associated with the control object to change a position of the model based on data captured through the video capture device, wherein the data captured includes the marker. The method includes moving the video game object presented on the display screen in substantial real-time according to the change of position of the model.

11 Claims, 11 Drawing Sheets

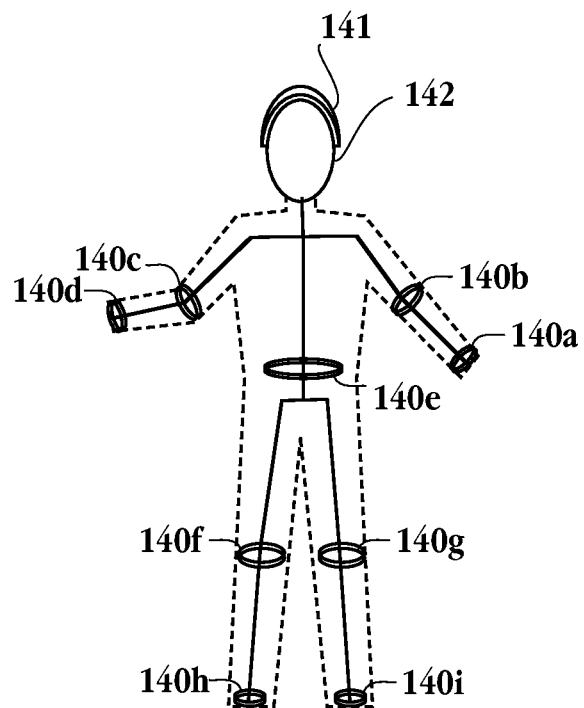
Fig. 3
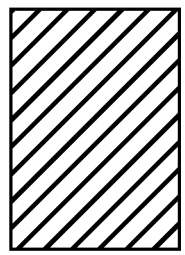 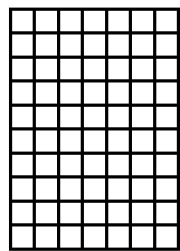 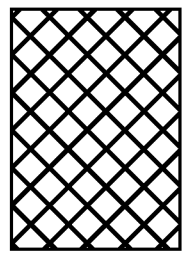
Fig. 4A   Fig. 4B   Fig. 4C

METHODS FOR CAPTURING IMAGES OF A CONTROL OBJECT AND TRACKING TO CONTROL INTERFACING WITH VIDEO GAME OBJECTS

CLAIM OF PRIORITY

This application claims priority from U.S. patent application Ser. No. 10/365,120, filed Feb. 11, 2003, and entitled "METHOD AND APPARATUS FOR REAL TIME MOTION CAPTURE," which is incorporated herein by reference.

FIELD OF THE INVENTION

This invention relates generally to video processing and more particularly to tracking depth of an image and/or a marker associated with the image to provide real time motion capture for video game applications.

BACKGROUND OF THE INVENTION

Movies, video games and other related video productions capture distance and dimension information. With respect to movies, an actor or sport figure's moves may be separately captured. For example, a sport figure may be filmed by a plurality of cameras while performing an activity. Objects, i.e., balls, attached to the sport figure enable the tracking of the moves. The tracked movements are then stored in a database for later use in a movie or video game. The movements may be played back by running through the frames of the stored movements in the database.

FIG. 1 is a schematic diagram of a person having a plurality of balls distributed over their body to store the person's moves. Person 100 has a plurality of balls 102 distributed over their body. Person 100 will then perform some activity which is captured by a plurality of cameras 104. The captured video data may then be edited as desired to define video data 106. Video data 106 is then stored in database 108 for later retrieval for insertion into a movie.

The scheme described with respect to FIG. 1 works well for a controlled environment, such as movie editing, where real time motion capture is not needed. In addition, since the person's movements are captured and stored, the person only has to wear the balls once. However, the motion capture as described with respect to FIG. 1 is used in a passive sense, i.e., editors insert the stored movement into a movie while editing the movie. Thus, the captured movement does not control any aspects of the movie and is inserted into a movie at a later time. The same holds true for a video game, i.e., captured motion is not used to control any aspects of a video game. In part, the complex computational capabilities and the need for point by point scanning has prohibited the use of captured motion to act as a control in real time.

As a result, there is a need to solve the problems of the prior art to provide a method and apparatus for providing real time motion capture that is capable of controlling aspects of a video game such as object and character movements.

SUMMARY

Broadly speaking, the present invention fills these needs by providing a method and apparatus enabling control of a video game character and object through real time motion capture of a person playing the video game. It should be appreciated that the present invention can be implemented in numerous ways, including as a method, a system, computer readable media or a device. Several inventive embodiments of the present invention are described below.

In one embodiment, a method for real time motion capture for control of a video game character is provided. The method initiates with defining a model of a control object. Then, a location of a marker on the model is identified. Next, movement associated with the control object is captured. Then, the movement associated with the control object is interpreted to change a position of the model. Next, movement of the character being presented on the display screen is controlled according to the change of position of the model.

In another embodiment, a method for controlling an object presented on a display screen in communication with a computing device through real time motion capture is provided. The method initiates with identifying a depth image associated with an object being tracked. Then, a model associated with both an object presented on a display screen and the object being tracked is identified. Next, the model is fit to the depth image to capture motion associated with the object being tracked. Then, the object presented on the display screen is controlled in real time according to the fitting of the model to the depth image.

In yet another embodiment, a method for controlling movements of an image presented on a display screen through real time motion capture is provided. The method initiates with defining a model of a person. Then, a location of a marker on the model of the person is identified. Next, a depth image corresponding to a portion of the model of the person is provided. The portion of the model includes the marker. Then, the location of the marker is associated with a point on the depth image. Next, the portion of the model is positioned based upon a configuration of the depth image. Then, a video character displayed on a display screen is controlled according to the positioning of the portion of the model.

In still yet another embodiment, a computer readable media having program instructions for controlling an object presented on a display screen, in communication with a computing device, through real time motion capture is provided. The computer readable media includes program instructions for identifying a depth image of an object being tracked and program instructions for identifying a model associated with both an object presented on a display screen and the object being tracked. Program instructions for fitting the model to the depth image to capture motion associated with the object being tracked are included. Program instructions for controlling the object presented on the display screen in real time according to the fitting of the model to the depth image are provided.

In another embodiment, a system enabling control of an object through real time motion capture associated with a control image is provided. The system includes a computing device. A display screen in communication with the computing device is provided. The display screen is configured to display an image of an object, where data corresponding to the image of the object is provided to the display screen by the computing device. A video capture device in communication with the computing device is includes. The video capture device is enabled to track a control object. The video capture device is configured to translate motion associated with the control object to control motion of the object being displayed on the display screen as the control object moves.

In yet another embodiment, a system enabling control of video character through real time motion capture associated with a control image is provided. The system includes a computing device. Means for displaying an image of a video character from data received by the computing device and means for capturing a depth image associated with a control object are provided. Means for fitting a model to the depth image to define movement of the control object are included. Means for translating the movement of the control object to control motion associated with the video character on a display screen as the control object moves are also included.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 3 is a schematic diagram of a model of a person where the model includes markers depicting joint angles in accordance with one embodiment of the invention.

FIGS. 4A through 4C illustrate exemplary patterns that may be worn by the control object as a marker in accordance with one embodiment of the invention.

DETAILED DESCRIPTION

Figure 1:
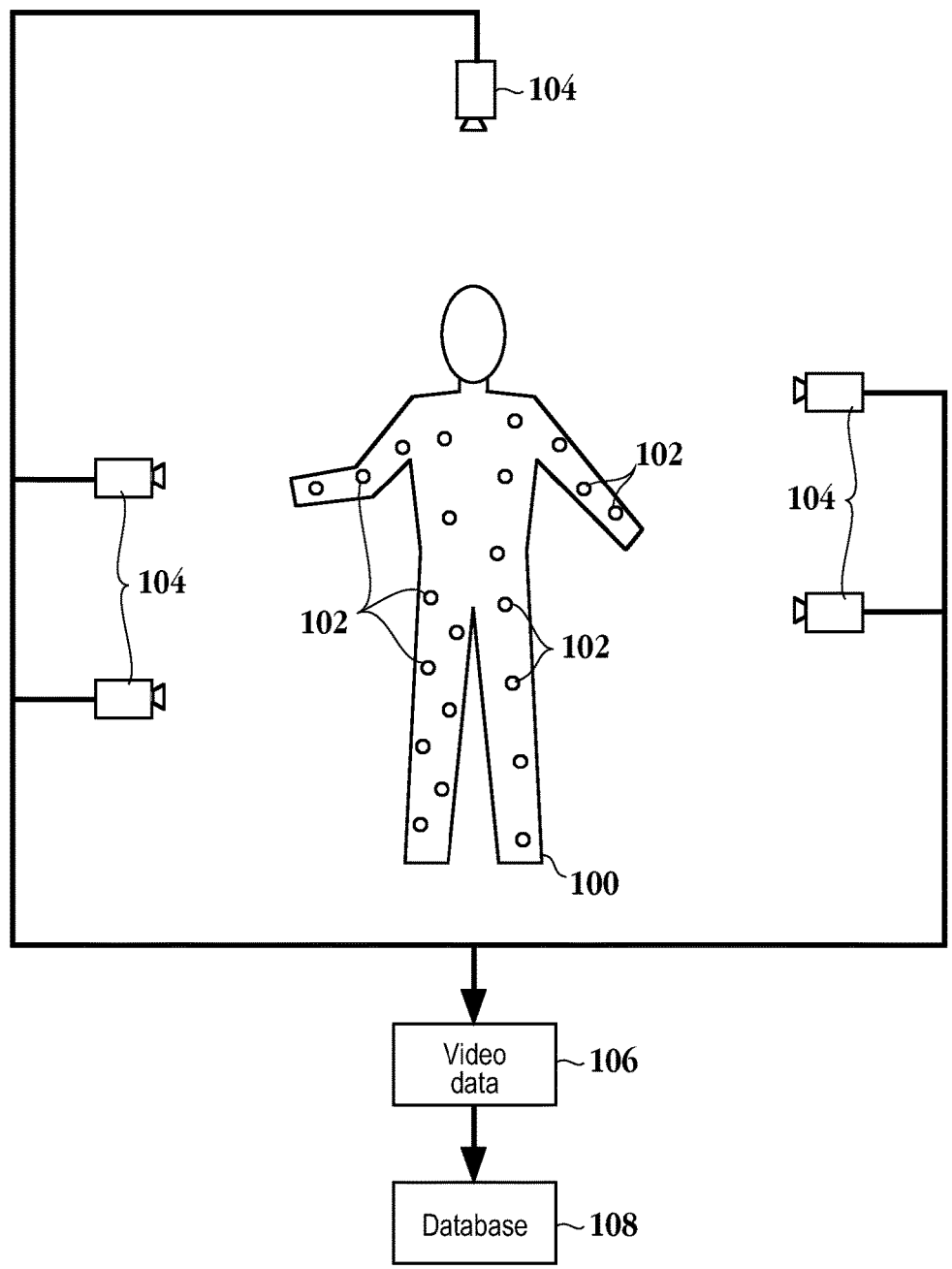
FIG. 1 is a schematic diagram of a person having a plurality of balls distributed over their body to store the persons moves.

An invention is described for a system, apparatus and method that enables real time motion capture which may be used to control a character or object of a video game. It will be obvious, however, to one skilled in the art, that the present invention may be practiced without some or all of these specific details. In other instances, well known process operations have not been described in detail in order not to unnecessarily obscure the present invention. FIG. 1 is described in the "Background of the Invention" section. The term about as used to herein refers to +/−10% of the referenced value.

The embodiments of the present invention provide a system and method for allowing real time motion capture to control a video game character or object. The movement of a person playing a video game, is used to control a character on a display screen associated with the video game. Thus, real time motion capture of the person playing the video game is used to control the character on the display screen. Here, the raw movement data of the person playing the video game is captured and used for control purposes in real time, as opposed to movement capture that is edited offline and then inserted into a movie at a later point in time.

In one embodiment, the movement of a human character presented on a display screen is controlled by the movement of a user or a person acting as a control object. The movement of the user may be captured through a video capture device, also referred to as an image capture device, such as a web cam or some other suitable type of camera. In one embodiment, the video capture device is configured to capture a depth image of the control object. The depth image of the control object provides data associated with a distance or depth associated with each pixel relative to the video capture device. Therefore, a skeleton associated with the control object and defining the location of joint angles may be mapped to a human character or even a non-human character. In another embodiment, markers worn by the control object may be used to indicate the location of joint angles. The depth images are combined with the skeleton using the locations defined by the markers to create a control object. In turn, motion of the control object is then used to control a character image on a display screen. For example, the character image may be an image from a video game. Thus, the person playing the video game is enabled to control the character image showing on a display screen. As will described in more detail below, the embodiments of the invention described herein, include real time motion capture for controlling a video character through markers. In another embodiment, a video capture device configured to provide depth information may be used with or without markers for the real time motion capture used to control a video character. As will described below, the markers may include colors, patterns, retro-reflective material, light, etc.

Figure 2:
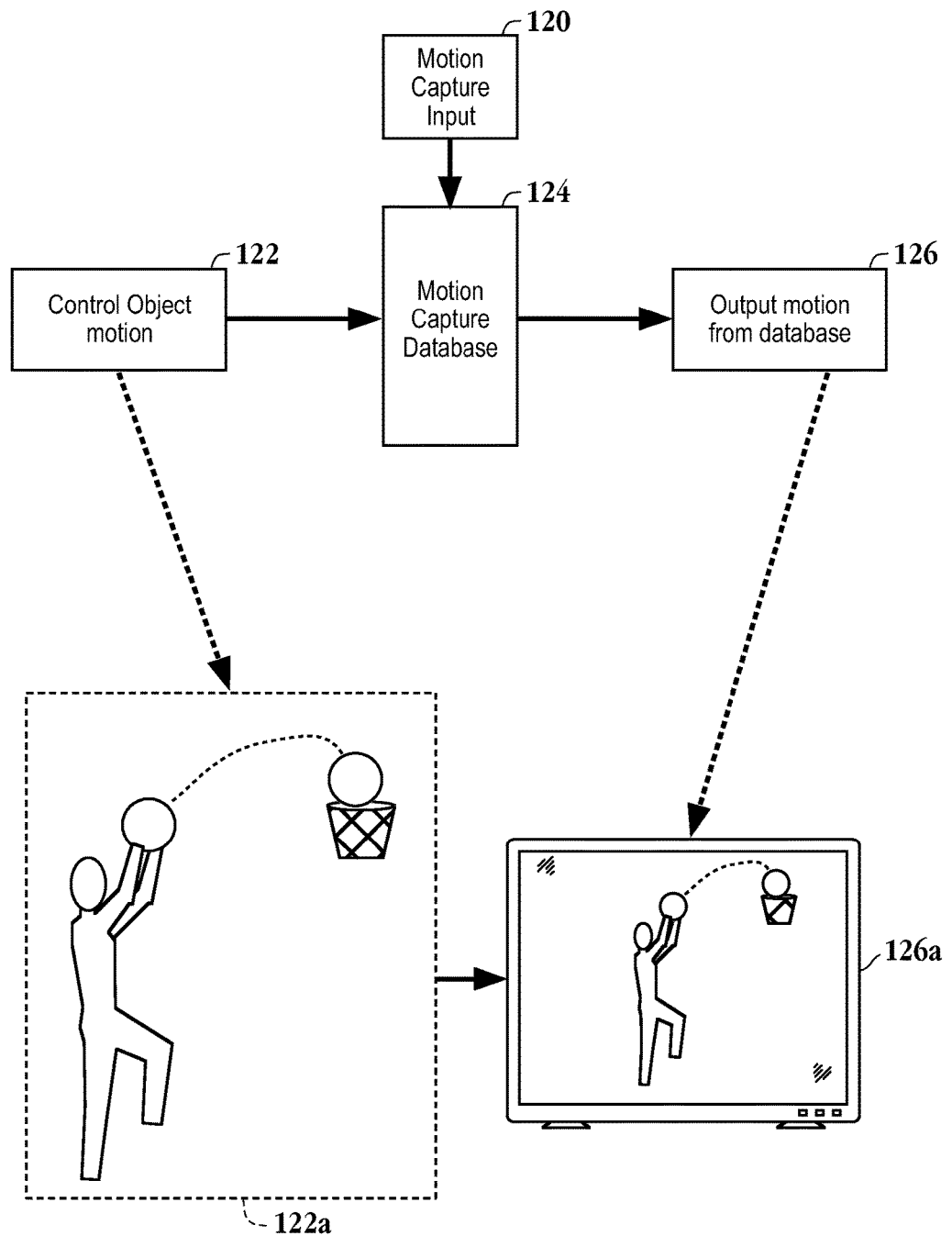
FIG. 2 is a simplified schematic diagram illustrating real time motion capture used to control a character of a video game in accordance with one embodiment of the invention.

FIG. 2 is a simplified schematic diagram illustrating real time motion capture used to control a character of a video game in accordance with one embodiment of the invention. Motion capture input 120 is stored in motion capture database 124. Control object motion 122 is captured through a capture device, such as a web cam, and associated with corresponding motion capture input 120 stored in database 124. The associated motion capture input is then presented on a display screen as represented as output motion from data base 126. For example, control object motion 122 may capture some motion or activity of a person playing a video game. In one embodiment, motion capture database 124 stores a plurality of motion capture input files 120 that capture the motion of a professional athlete. Accordingly, control object motion 122 is associated with a similar motion capture input 120 that corresponds to the control object motion and the similar motion capture input is presented on a display screen in real time. Therefore, the effect that the control object, e.g., a person playing a video game, is controlling the motion or activity of the professional athlete in real time is provided. It should be appreciated that motion capture input may also be artist animated data, e.g., non-human game characters, animated character images, etc. In another embodiment, control object motion 122 is used as constraint information. Here, the constraint information drives the animation of a character image, therefore, control object motion 122 directly controls the motion of a game character. It should be appreciated that a physical simulation system may accomplish this feature. In one embodiment, the game character mirrors the motion of the control object. In another embodiment, certain movement of the control object is mapped to cause a different movement of the game character. For example, when the control object moves a limb, arm or leg, the limb movement may be mapped to cause the eyebrows of a video game character to move. It should be appreciated that any type of control object movement may be mapped to any different type of movement of a character image, such as a video game character.

Still referring to FIG. 2, in a more specific example, control object motion 122 may depict a person playing a basketball video game where the person performs a shooting motion as depicted in block 122a. The shooting motion of block 122a is associated with a shooting motion of a professional basketball player stored in database 124. The shooting motion of the professional basketball player is displayed on a viewable screen as depicted in block 126a. Therefore, the motion capture of the person playing the video game is used to control, in real time, the professional character performing a similar motion. It should be appreciated that the basketball example is shown for illustrative purposes and not meant to be limiting. That is, the motion of the person playing the video game may correspond to any sport motion. Furthermore, the motion of the person playing the video game may be associated with non-sport activities. For example, the captured motion of the person playing the video game may be used to control movements of an animal or other non-human living object being displayed by the video game or even an inanimate object.

FIG. 3 is a schematic diagram of a model of a person where the model includes markers depicting joint angles in accordance with one embodiment of the invention. In one embodiment, the model is a skeleton image. As used herein, a skeleton image refers to any model of a structure that is tracked and is not limited to an articulated model where the model is rigid but has joints. Furthermore, the skeleton image may be defined with varying precision, e.g., a variety of joint constraints. Of course, the more joints and limbs associated with the skeleton image or the model, correlates to more data required to be tracked. Here, markers 140a-140i are distributed over skeleton image 142. Markers 140a and 140d correspond to the wrist location, markers 140b and 140c correspond to an elbow location while marker 140e corresponds to the torso. Markers 140g and 140f correspond to the knees and markers 140h and 140i correspond to the ankles. Of course, the embodiments described herein are not limited to the placement of the markers or the number of markers depicted in FIG. 3, as more or less markers can be used. For example, headphones 141 can be used as a marker indicating a position of a head of the control object. One skilled in the art will appreciate that a headband may be used as a marker. Here, ear insertable devices may be provided where the ear insertable devices act as a marker and provide sound for the control object. Thus, a video capture device, e.g., camera, provides an image of a person playing the video game where the person playing the video game is wearing the markers. For example, the markers may be configured as straps a person can wear or the markers may be incorporated into the fabric of the person, i.e. control object. Software can then analyze the captured image of the person with the markers to create skeleton image 142 with known location of the joint angles as provided by markers 140a-140i.

In one embodiment, the video capture device is configured to provide a depth image that can be used to fill in portion of the skeleton image and position the skeleton image in three dimensional space. Thus, markers 140a-140i provide data as to a starting location of an appendage or limb and the depth image from the video capture device can fill in the appendage or limb in three dimensional space. As used herein, the terms appendage and limb are not meant to be limiting as a person, i.e., control object, may be controlling an object that is also captured by the depth image. Thus, the appendage or limb may include the objects being controlled by the person acting as a control object. In another embodiment, the video capture device does not have depth capturing capability and the markers will indicate a known location in space for a starting point of an appendage or limb. Here, an arm, hand, leg, foot, or some other appendage may be filled in from a database storing a typical configuration of the associated appendage. For example, a depth image of the control object can be taken prior to starting the game and the depth image may be stored in a database as a model to be used as needed for the control of a video game character in real time. In yet another embodiment, a video capture device is used to capture motion of the person playing the video game without markers. Here, certain assumptions about the location of the object, e.g., which hand, foot, etc., are from the right side or left side are made in order to translate the captured motion for control of a video game character. Thus, in each embodiment described above, the captured motion is used to control motion associated with a character of a video game in real time.

It should be appreciated that the markers may take on various forms. For example, material having a certain shape, color, pattern, reflective capability, or some other distinguishing quality so that a video capture device can identify a point in space by the marker may be used. One skilled in the art will appreciate that retro-reflective material may be used to provide a distinguishing reflective capability. Additionally, a light associated with the video capture device may be used in combination with the retro-reflective tape to provide the location in space of the starting point for a particular appendage of the control object. In one embodiment, the markers may take the form of blinking lights. Here, the lights could be non-visible light, such as infrared light. The lights may blink at a set frequency where the set frequency corresponds to a particular person or team.

FIGS. 4A through 4C illustrate exemplary patterns that may be worn by the control object as a marker in accordance with one embodiment of the invention. The exemplary patterns include a striped pattern of FIG. 4A, a block pattern of FIG. 4B and a crosshatching pattern of FIG. 4C. It will be apparent to one skilled in the art that the patterns illustrated in FIGS. 4A-4C are not meant to be limiting as any type of pattern capable of being recognized by a video capture device may be used. It should be appreciated that the different patterns may be used to differentiate between right and left limbs in one embodiment. For example, marker 140d of FIG. 3 may include the pattern of FIG. 4A, while marker 140a of FIG. 3 may include the pattern of FIG. 4B. Accordingly, the right and left wrists will be differentiated. Additionally, shapes, colors, etc., may be used in conjunction with the patterns to define a marker. Thus, should the pattern become deformed through movement, a backup indicator is still available for the marker.

Figure 5:
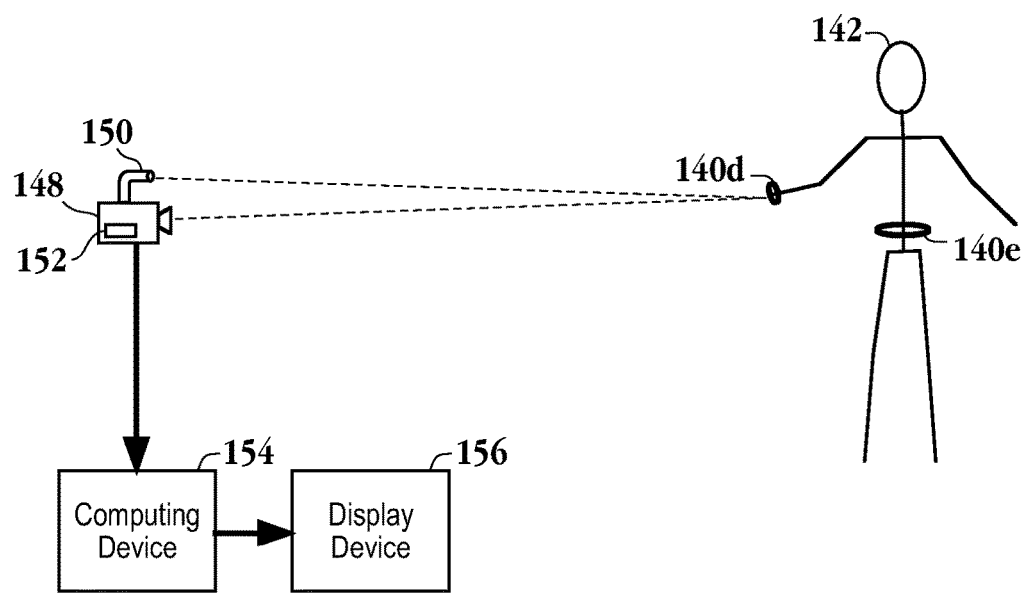
FIG. 5 is a schematic diagram of real time motion capture of a control object being used for controlling movement associated with a character presented on a display screen in accordance with one embodiment of the invention.

FIG. 5 is a schematic diagram of real time motion capture of a control object being used for controlling movement associated with a character presented on a display screen in accordance with one embodiment of the invention. Skeleton image 142, corresponding to a person playing a video game, is tracked by video capture device 148. In one embodiment, video capture device 148 is configured to capture depth data for each pixel. For example, depth cameras offered by 3DV STSTEMS or CANESTA may be employed as video capture device 148 for the embodiments described herein that capture depth data. Where the person playing the video game is wearing retro-reflective tape as a marker, camera 148 includes light 150. In one embodiment, light 150 may be an infrared light. In another embodiment, light 150 is blinking so that it is possible to differentiate between permanent lights in a scene and markers to be tracked, i.e., the reflection of the blinking light from the retro-reflective tape. The retro-reflective tape, reflects all of the light from light 150, therefore, the retro-reflective tape will be a bright spot in the image data provided by video capture device 148. The bright spot or void will indicate a starting point for an appendage associated with the marker. For example, marker 140d is associated with a right wrist and would indicate the starting point for a depth image including the right wrist, which could include a hand or a forearm. Of course, the hand could be controlling an object as described above. It should be appreciated that camera 148 may include several blinking lights of different colors. Here, the retro-reflective tape, or any suitable reflective marker, may be designed to reflect different colors, thereby allowing for differentiation between a number of reflective markers.

Marker 140c of FIG. 5 indicates the position of the torso. As mentioned above, any number of markers may be worn by the control object at defined locations. It will be apparent to one skilled in the art that the capture device can identify the particular marker as being associated with a particular appendage, i.e., wrist or torso with respect to FIG. 5. Where video capture device 148 is configured to provide a depth image, the video capture device provides the data to fill in the rest of the body for skeleton image 140 with the depth information as described with reference to FIG. 8. Camera 148 includes microprocessor 152 configured to combine the depth information with the marker location to generate and track the image of the control object, i.e., person playing the video game. Microprocessor 152 may perform processing functions as described with reference to FIG. 9. Camera 148 is in communication with computing device 154, which in turn is in communication with display device 156. In one embodiment, computing device 154 is a video game console such as the "PLAYSTATION 2"® manufactured by Sony Computer Entertainment Inc. In another embodiment, light 150 may be configured to emit light in the infrared spectrum to minimize the visible light directed at the control object.

Figure 6A:
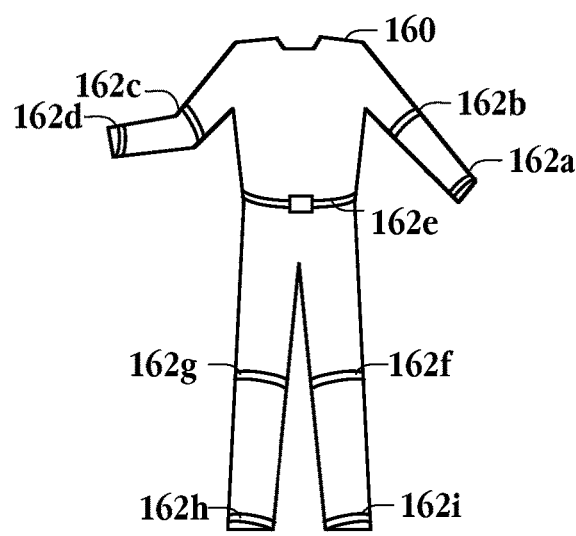
FIG. 6A is a schematic diagram of a bodysuit having markers included in the bodysuit in accordance with one embodiment of the invention.

FIG. 6A is a schematic diagram of a bodysuit having markers included in the bodysuit in accordance with one embodiment of the invention. Markers 162a through 162i may be integrated into bodysuit 160 at joint locations corresponding to the locations discussed with reference to FIG. 3. In one embodiment, torso marker 162e may be encoded with data that identifies the person wearing the suit with a certain sports figure, celebrity, team identification, etc. Additionally, a marker may be encoded to provide the person wearing the suit with enhanced features during a video game. For example, the bodysuit may provide the user extra protection through more body armor or other enhancements that would entice consumers to purchase the bodysuits for use with a video game.

Figure 6B:
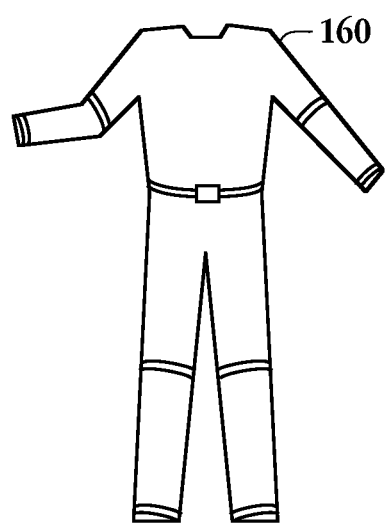
FIG. 6B is an alternative embodiment to the body suit of FIG. 6A.

FIG. 6B is an alternative embodiment to the bodysuit of FIG. 6A. Here, micro fibers of retro-reflective material are woven into bodysuit, i.e., incorporated throughout the fabric of bodysuit 160. Thus, the retro-reflective material is distributed throughout the bodysuit. Here, the body suit would appear as a maximum to a depth camera, but would be preferable for the embodiment where the camera is not enabled to capture depth data. That is, where the video capture device is configured to provide two dimensional image data, it is preferable to have as much of the control object to be as reflective as possible, in order to more easily track the control object for control of a video game character in real time. Of course, it is not necessary for the control object to be covered by reflective material as strategically placed straps will suffice as discussed above.

Figure 7:
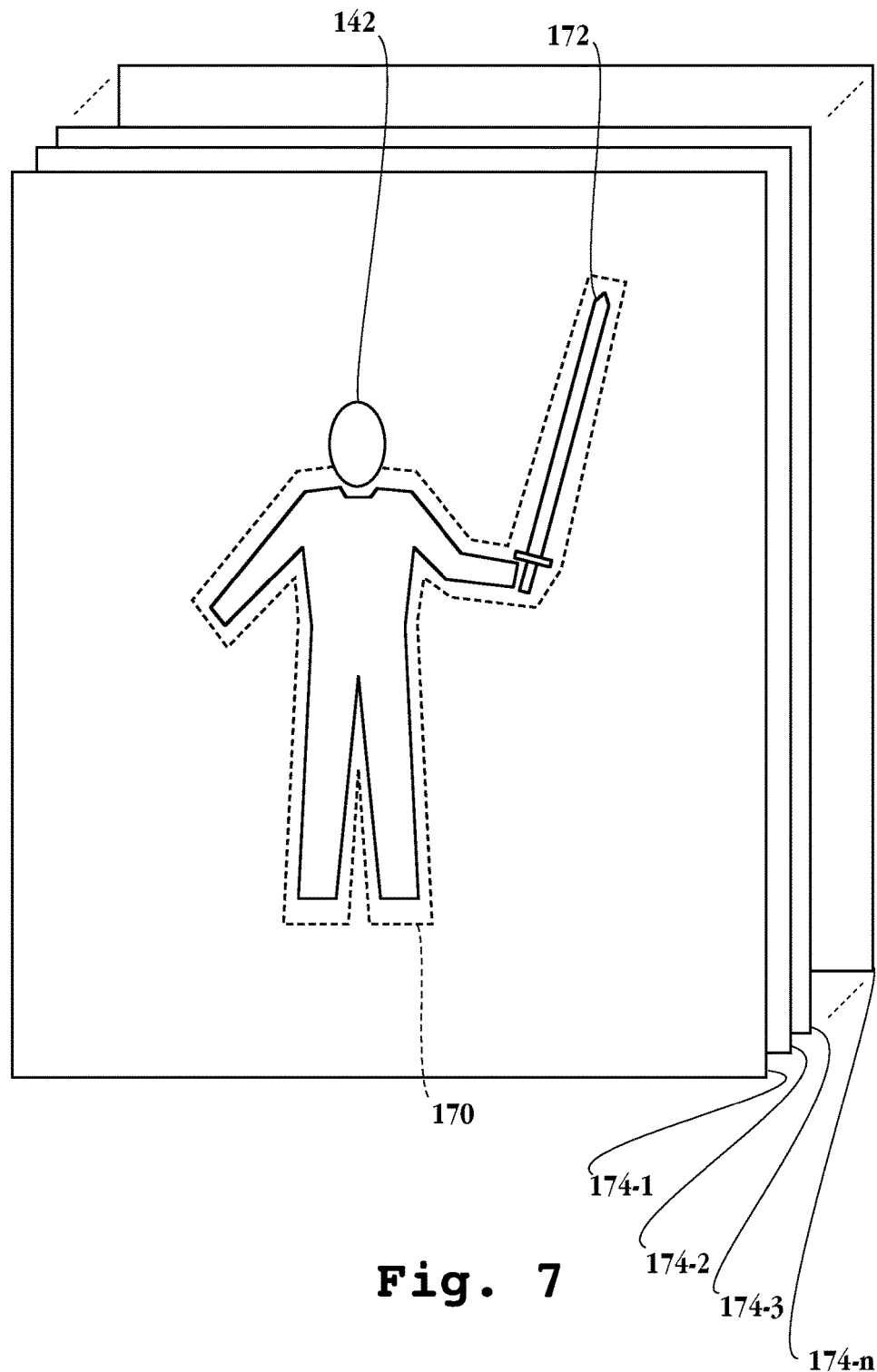
FIG. 7 is a schematic diagram illustrating an optimization technique for monitoring an image frame for markers in accordance with one embodiment of the invention.

FIG. 7 is a schematic diagram illustrating an optimization technique for monitoring an image frame for markers in accordance with one embodiment of the invention. Here, region 170 which defines an area around skeleton image 142. Thus, rather than search the entire frame of data for a marker, only a portion of the frame defined around skeleton image 142 is searched for successive frames. Here, a portion of frames 174-2 through 174-n would be searched to enhance performance. Skeleton image 142 is shown controlling object 172, where object 172 is a sword. It should be appreciated that while the control object has mainly been referred to as a person, the person may control an object such as a sword, ball, bat, etc. Thus, the motion associated with the object being controlled may also be captured to control a similar object on a display screen in real time, e.g., where the video character is controlling a sword.

Figure 8:
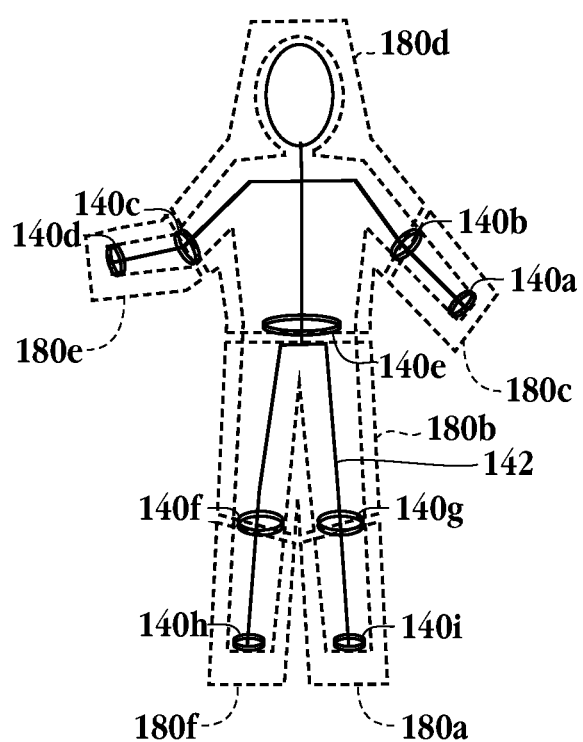
FIG. 8 is a schematic diagram of a model depicting regions filled in by a depth image in accordance with one embodiment of the invention.

FIG. 8 is a schematic diagram of a model depicting regions filled in by a depth image in accordance with one embodiment of the invention. As mentioned with reference to FIG. 3, a video capture device, e.g., camera, provides an image of a person playing the video game where the person playing the video game is wearing the markers. The captured image of the person is analyzed with the markers to create skeleton image 142, also referred to as a model, with known location of the joint angles as provided by markers 140a-140i. In one embodiment, the person wearing the markers stands in front of the video capture device to define a model or body mesh of the control object that is stored as mentioned above. That is, a calibration step is performed initially to define a model depth image for the control object. Then, the depth image or portions of the depth image are used to fill in skeleton 142 to create a three dimensional image. The respective marker defines a position for the corresponding depth image portion to be located. For example, left and right forearms are be defined in regions 180c and 180e, respectively. Upper torso and lower torso are defined in regions 180d and 180b, respectively, while left shin and right shin are defined in regions 180a and 180f, respectively. Additionally, hands and feet are defined below respective markers 140a, 140d, 140i and 140h. Thus, the markers define a starting location and the depth image is used to fill in the remainder to provide a three dimensional control object for controlling the motion of a video game character in real time.

Figure 9:
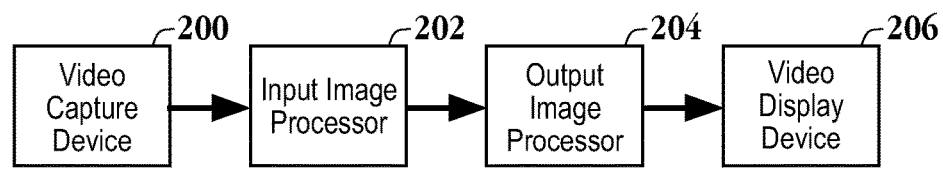
FIG. 9 is a block diagram of an exemplary user input system for interaction with an object on a graphical display that can be used to implement embodiments of the present invention.

FIG. 9 is a block diagram of an exemplary user input system for interaction with an object on a graphical display that can be used to implement embodiments of the present invention. As shown in FIG. 9, the user input system is comprised of a video capture device 200, an input image processor 202, an output image processor 204, and a video display device 206. Video capture device 200 may be any device capable of capturing sequences of video images, and, in one embodiment, is a digital video camera (such as a "web-cam"), or similar image capturing device. As mentioned above, the video capture device may be configured to provide depth image. Input image processor 202 translates the captured video images of the control object into signals that are delivered to an output image processor. In one embodiment, input image processor 202 is programmed to isolate the control object from the background in the captured video image through the depth information and generate an output signal responsive to the position and/or movement of the control object. The output image processor 106 is programmed to effect translational and/or rotational movement of an object on the video display device 108 in response to signals received from the input image processor 104.

These and additional aspects of the present invention may be implemented by one or more processors which execute software instructions. According to one embodiment of the present invention, a single processor executes both input image processing and output image processing as illustrated in FIG. 5. However, as shown in the figures and for ease of description, the processing operations are shown as being divided between an input image processor 202 and an output image processor 204. It should be noted that the invention is in no way to be interpreted as limited to any special processor configuration, such as more than one processor. The multiple processing blocks shown in FIG. 9 are shown only for convenience of description.

Figure 10:
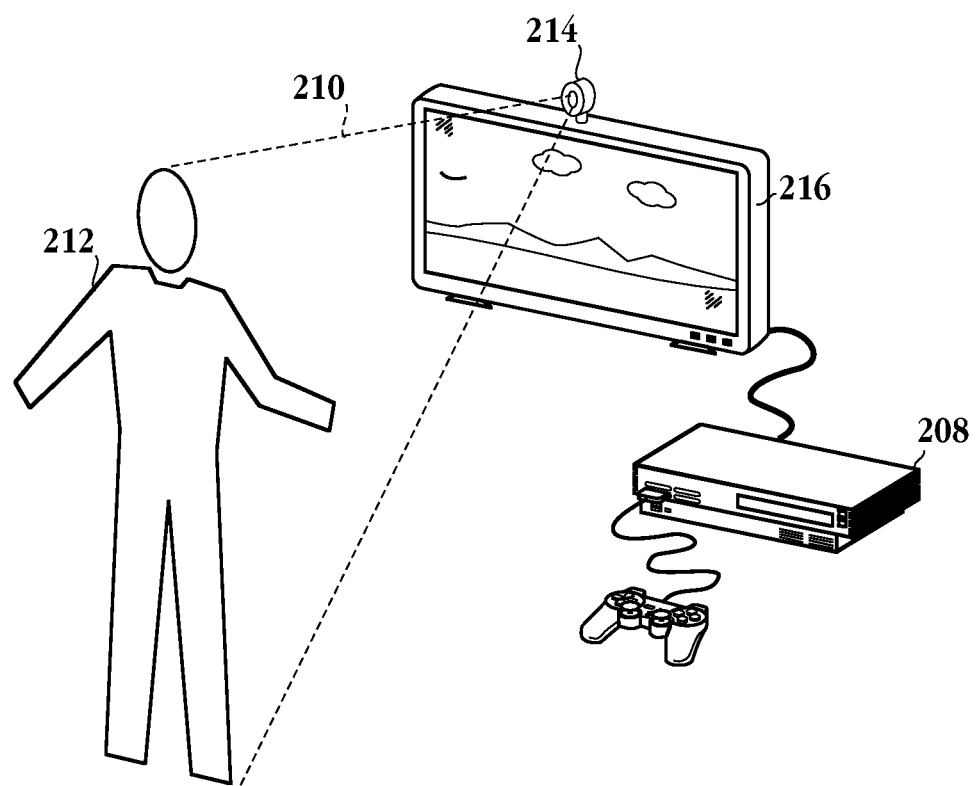
FIG. 10 illustrates an input system for user interaction with an object on a graphical display, according to embodiments of the present invention.

FIG. 10 illustrates an input system for user interaction with an object on a graphical display, according to embodiments of the present invention. The input system environment includes control object 212, video capture device 214, video display device 216, and console 208 containing the processor functionality, such as a video game machine. Control object 212 in the input system environment should be located within the field of view 210 of the video capture device 214. Processing system 208 can be implemented by an entertainment system or game console, such as a Sony® Playstation™ II or Sony® Playstation™ I type of processing and computer entertainment system. It should be noted, however, that processing system 208 can be implemented in other types of computer systems, such as personal computers, workstations, laptop computers, wireless computing devices, or any other type of computing device that is capable of receiving and processing graphical image data. Of course, control object 212 may incorporate markers as described above and/or video capture device 214 may include depth capturing capability.

Figure 11:
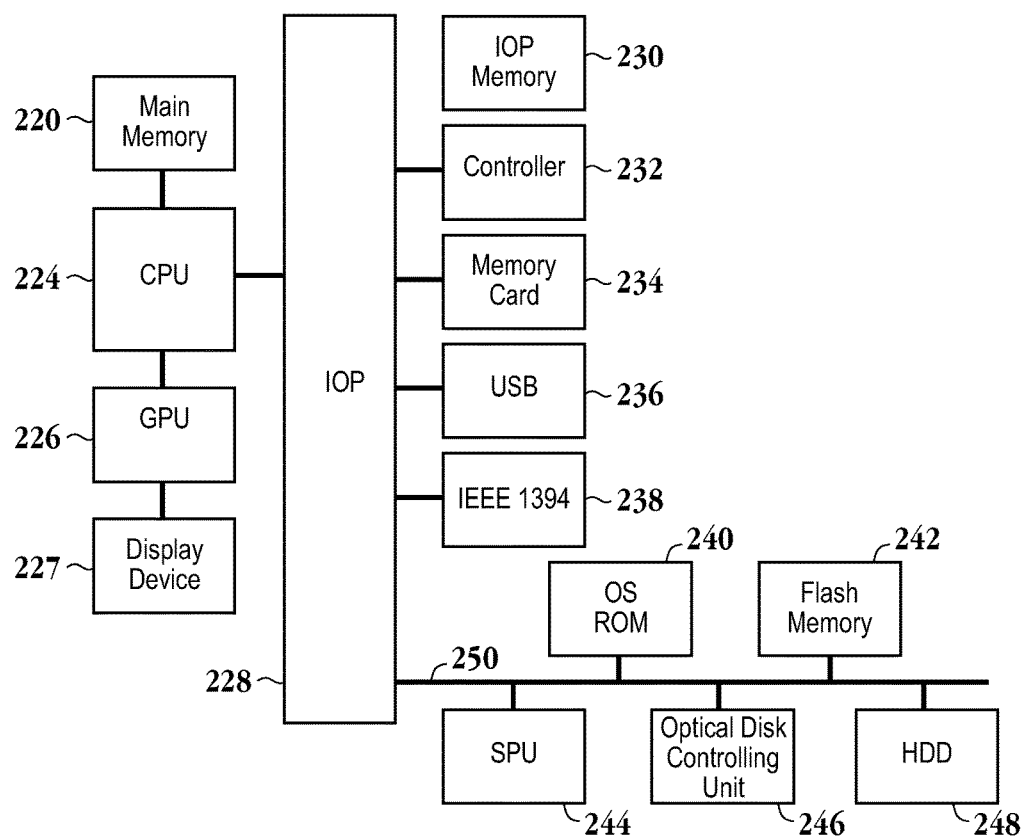
FIG. 11 is a simplified block diagram of a computer processing system configured to implement the embodiments of the invention described herein

FIG. 11 is a simplified block diagram of a computer processing system configured to implement the embodiments of the invention described herein. The processing system may represent a computer-based entertainment system embodiment that includes central processing unit ("CPU") 224 coupled to main memory 220 and graphical processing unit ("GPU") 226. CPU 224 is also coupled to Input/Output Processor ("IOP") Bus 228. In one embodiment, GPU 226 includes an internal buffer for fast processing of pixel based graphical data. Additionally, GPU 226 can include an output processing portion or functionality to convert the image data processed into standard television signals, for example NTSC or PAL, for transmission to display device 227 connected external to the entertainment system or elements thereof. Alternatively, data output signals can be provided to a display device other than a television monitor, such as a computer monitor, LCD (Liquid Crystal Display) device, or other type of display device.

IOP bus 228 couples CPU 224 to various input/output devices and other busses or device. IOP bus 228 is connected to input/output processor memory 230, controller 232, memory card 234, Universal Serial Bus (USB) port 236, IEEE1394 (also known as a Firewire interface) port 238, and bus 250. Bus 250 couples several other system components to CPU 224, including operating system ("OS") ROM 240, flash memory 242, sound processing unit ("SPU") 244, optical disc controlling unit 246, and hard disk drive ("HDD") 248. In one aspect of this embodiment, the video capture device can be directly connected to IOP bus 228 for transmission therethrough to CPU 224; where, data from the video capture device can be used to change or update the values used to generate the graphics images in GPU 226. Moreover, embodiments of the present invention can use a variety of image processing configurations and techniques, such as those described in U.S. patent application Ser. No. 09/573,105 filed May 17, 2000, and entitled OUTLINE GENERATING DATA, GENERATING METHOD AND APPARATUS, which is hereby incorporated by reference in its entirety.

Programs or computer instructions embodying aspects of the present invention can be provided by several different methods. For example, the user input method for interaction with graphical images can be provided in the form of a program stored in HDD 248, flash memory 242, OS ROM 240, or on memory card 232. Alternatively, the program can be downloaded to the processing unit through one or more input ports coupled to CPU 224. The program modules defining the input method can be provided with the game or application program that is executed by CPU 224 and displayed on display device 227 or they may be provided separately from the application program, such as for execution from local main memory 220.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

Figure 12:
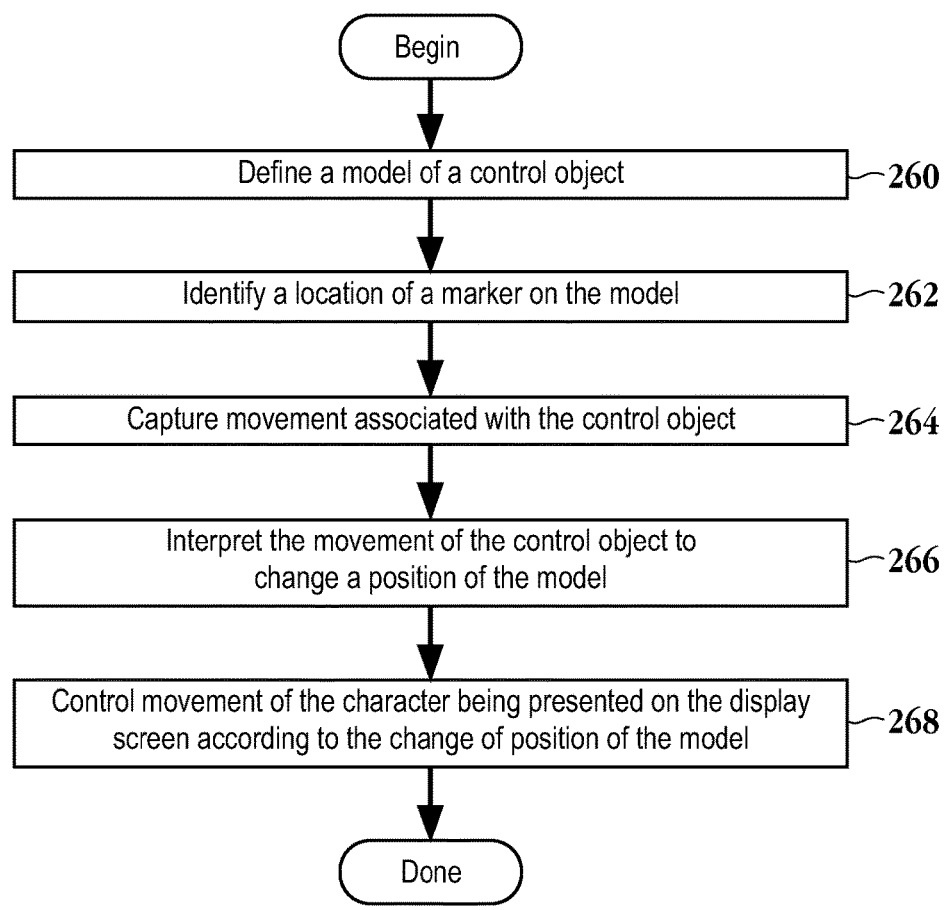
FIG. 12 is a flowchart diagram of the method operations for real time motion capture for controlling a character presented on a display screen in accordance with one embodiment of the invention.

FIG. 12 is a flowchart diagram of the method operations for real time motion capture for controlling a character presented on a display screen in accordance with one embodiment of the invention. The method initiates with operation 260 where a skeleton image or a model of a control object is defined. The control object may be a person playing a video game associated with the character presented on the display screen. It should be appreciated that the person may stand in front of a video capture device within the field of view of the video capture device in order to define a model of the person as described above. Thus, the skeleton image or model may be defined through a self calibration process where the person stands in front of the video capture device. The method then advances to operation 262 where a location of a marker on the skeleton image or model is identified. For example, the markers may indicate the location of joint angles on the skeleton image or model as described with reference to FIGS. 3, 5 and 8. It should be appreciated that the markers may take on the various formats as described herein.

The method of FIG. 12 then proceeds to operation 264 where movement associated with the control object is captured. In one embodiment, the movement is captured through a camera configured to provide a depth image, i.e., image data associated with a z axis as well as an x axis and y axis. In another embodiment, the movement is captured in two dimensions by a digital video camera, such as a web cam. The method then moves to operation 266, where in response to the movement of the control object, a position of the skeleton image or model is changed. That is, the skeleton image is moved to correspond with the movement of the control object. It should be appreciated that where a depth camera is used as a video capture device, a depth image corresponding to the skeleton image may be provided here. The skeleton image is positioned to correspond with the position of the depth image.

For exemplary and illustrative purposes, the skeleton image may be thought of as a rag doll that is positioned to correspond with the position of the depth image. As the control object moves, the depth image tracks the movement of the control object, in turn, the skeleton image is also similarly moved to follow the depth image. Thus, the movement of the control object is repeated by the skeleton image. As mentioned above, the markers may be used without the depth camera. Similarly, the depth camera may be used without the markers. It should be appreciated that the depth camera captures the three dimensional data, however, the depth camera does not have the knowledge to map the three dimensional data to the skeleton. The markers provide known data points in space, therefore, the markers enable the depth data to be mapped to the skeleton. Of course, without the use of the markers certain assumptions may be made so that the depth data can be mapped to the skeleton. That is, the markers eliminate the need for the assumptions as an actual point, such as a joint angle, is labeled by the marker and the corresponding depth data can be filled in from the point identified by the marker. The method then advances to operation 268 where the movement of the character being presented on the display screen is controlled according to the change of position of the skeleton. Here, the movement of the character is being controlled in real time. That is, as the control object moves, the skeleton is positioned accordingly through the use of image data having depth information and/or markers.

In one embodiment, a system enabling control of an object through real time motion capture associated with a control image consisting of various components defined in terms of the functions of each of the components. The system includes a computing device, e.g., a game console. The system may include means for displaying an image of a display object from data received by the computing device. Here, the means for displaying an image mat be any suitable display screen including a television monitor. Means for capturing a depth image associated with a control object are included. In one embodiment, the means for capturing a depth image may be provided by a camera enabled to provide depth data, such as the cameras available from 3DV SYSTEMS or CANESTA mentioned above. Means for fitting a skeleton image or model to the depth image to define movement of the control object are provided. For example, a microprocessor may provide the means for fitting the skeleton image to the depth image to define movement of the control object. As mentioned above, the processing may be provided through one or more microprocessors. Means for translating the movement of the control object to control motion associated with the display object on a display screen as the control object moves. Here again a microprocessor, such as a graphics processing unit, can accomplish the means for translating the movement of the control object to control motion associated with the display object. Of course, the microprocessors for performing the above described functionality can be included in a chipset.

In summary, the above described invention describes a method and a system for providing real time motion capture for controlling a character of a video game. The embodiments described above allow for real time motion capture which may be used to control a character or object of a video game. The ability to track depth combined with a marker can provide a starting point for identifying the limbs/body of a person (control object) being tracked. The person can then be filled in to resemble a true character or person. Thus, once a depth image is identified, a skeleton image associated with the depth image can be filled in from a database having the depth images or from depth images captured through the video capture device. Various forms of markers may be used in conjunction with a video capture device that may or may not capture depth images. Examples can include localized placement of wearable retro-reflective tape, e.g., on the wrists, knees, head, etc. Alternatively, body suits or clothes incorporating different types of markers (patches, identifiable thread, etc) may be provided. In one embodiment, once movement is identified (or detected), a reference to a database of movements may locate a corresponding movement in the database. For example, if the user of game selects a particular character, such as a famous ball player, the movement may be like that performed by the actual famous ball player. These movements would be stored in the database. The obtained database movement will thus be used to control the character (person/skeleton) that is part of the game. In one embodiment, a camera or hardware configured to track the depth can include a processor, special circuitry or a DSP that is configured to do the filling in, the database look ups and translate the user's actions into "on-screen" activity. As discussed above the term skeleton image may be defined broadly to include any model of any object being tracked, whether the object is a human object, an animated object or an inanimate object.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system.

Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for interfacing with a video game, comprising:
    detecting a person in a field of view of a video capture device;
    identifying skeleton image of the person, the skeleton image identifying one or more limbs of the person, wherein one of the limbs is a hand of the person and one of the limbs is a head of the person;
    detecting a marker in a location of the hand of the person, the marker being associated with an object being held in the hand of the person; and
    tracking the skeleton image and the detected object being held in the hand of the person by analyzing video frames obtained by the video capture device, during the tracking, identifying motion of the person and of the object being held in the hand of the person, the tracking being used to control and interface with one or more objects of the video game rendered on a display while the video game is executed by a processor.

2. The method for interfacing with a video game as recited in claim 1, wherein the identified motion of the person is compared to a database of motion, and based on the comparisons, at least part of the identified motion of the person is rendered on the display using a motion from the database of motions, the database of motions being predefined.

3. The method for interfacing with a video game as recited in claim 1, wherein the processor is part of a computing device, the computing device being in communication with the video capture device and the display device.

4. The method for interfacing with a video game as recited in claim 1, wherein the skeleton image represents a model of at least part of the person.

5. The method for interfacing with a video game as recited in claim 1, wherein the object includes a light, the light being one of non-visible or visible.

6. The method for interfacing with a video game as recited in claim 1, further comprising:
    determining depth parameters of at least part of the skeleton image, the depth parameters used to fill in the skeleton image and define a three dimensional image of at least part of the person.

7. A method for interfacing with a video game, comprising:
    detecting a person in a field of view of a video capture device;
    identifying skeleton image of the person, the skeleton image identifying one or more limbs of the person, wherein one of the limbs is a hand of the person and one of the limbs is a head of the person;
    detecting a marker in a location of the hand of the person, the marker being associated with an object being held in the hand of the person; and
    tracking the skeleton image and the detected object being held in the hand of the person by analyzing video frames obtained by the video capture device, during the tracking, identifying motion of the person and of the object being held in the hand of the person, the tracking being used to control and interface with one or more objects of the video game rendered on a display while the video game is executed by a processor,
    wherein before rendering on the display, at least part of the identified motion of the person is replaced with a motion from a database of motions for rendering on the display, the database of motions being predefined.

8. The method for interfacing with a video game as recited in claim 7, wherein the processor is part of a computing device, the computing device being in communication with the video capture device and the display device.

9. The method for interfacing with a video game as recited in claim 7, wherein the skeleton image represents a model of at least part of the person.

10. The method for interfacing with a video game as recited in claim 7, wherein the object includes a light, the light being one of non-visible or visible.

11. The method for interfacing with a video game as recited in claim 7, further comprising:
    determining depth parameters of at least part of the skeleton image, the depth parameters used to fill in the skeleton image and define a three dimensional image of at least part of the person.

* * * * *